Figure 1:
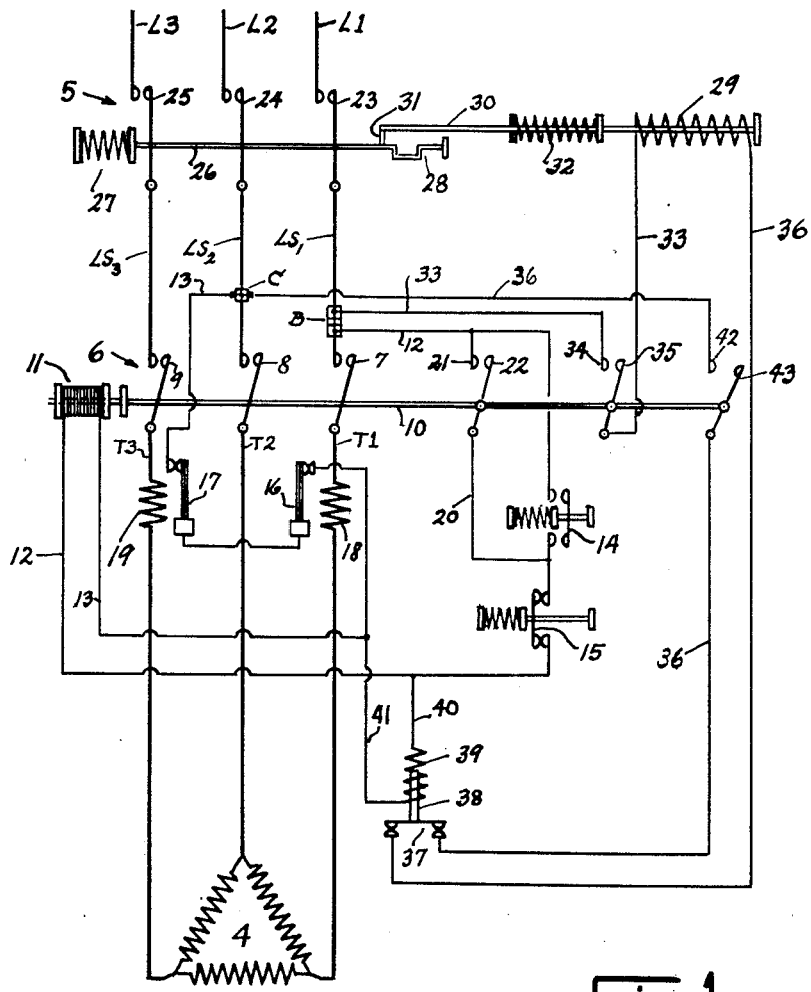

May 17, 1949.　　　　M. K. MOORE　　　　2,470,257

ELECTRICAL PROTECTIVE SYSTEM

Filed Nov. 23, 1945

INVENTOR.
M. K. MOORE
BY
ATTORNEY.

Patented May 17, 1949

2,470,257

UNITED STATES PATENT OFFICE 2,470,257

ELECTRICAL PROTECTIVE SYSTEM

Milton K. Moore, Corpus Christi, Tex.

Application November 23, 1945, Serial No. 630,202

4 Claims. (Cl. 175—294)

This invention relates to electrical safety devices for electric power systems and more particularly to such safety devices which are adapted for use with electromagnetically controlled switches employed in such systems.

In the operation of electrical motors, particularly in polyphase circuits, it has long been recognized that where one of the line conductors is broken, or that where, for some reason, there is a failure of voltage on one or more of the conductors, it is possible, nevertheless, that under certain conditions the protective devices normally provided, may not open the motor circuit and thereby cause damage to the motor. Various electrical systems have been heretofore designed and used to overcome this defect. However, it has been found that such systems are themselves frequently ineffective to accomplish the purposes sought, due to factors inherent in the form and construction of such protective devices which are commonly in use today. For example, most line circuits to motors are normally provided with an electromagnetically controlled switch, commonly termed a "magnetic contactor" and these in turn have various forms of auxiliary protective devices, electrically controlled, such as overload relays and auxiliary switches which are designed to open the magnetic contactors, upon failure of one or more of the conductors or under abnormal voltage conditions in one of the conductors. Such protective systems pre-suppose an ability to effect opening of the magnetic contactor upon the happening of any of the abnormal conditions referred to. However, this is not always the case, since a frequent source of trouble with standard types of magnetic contactors is that, for one reason or another, arcing will occur between contacts which results in freezing or welding together of one or more pairs of contacts thus preventing their separation under action of the normal protective system and thereby nullifying the protective action of the latter. Such failures in the magnetic contactors will result in serious damage to the motor unless the power in the main circuit to the motor circuit, including the magnetic contactor itself, can be cut off promptly. In present systems it is necessary, when such trouble develops in the magnetic contactor circuit, to manually trip the main circuit breaker. However, such failures in magnetic contactors often do not become apparent until the resultant damage has occurred and the manual opening of the main circuit breaker is thereby rendered ineffectual for purposes of protecting the motor against such failures.

Accordingly, it is a principal object of this invention to provide an electrical protective system for a motor circuit which will be effective under all abnormal conditions to automatically intercept the flow of power to such circuit.

Another object is the provision of a protective system for magnetic contactors which is responsive to failures in such contactors to automatically open the circuit supplying power to such contactors.

The protective system of the present invention is designed to supplement protective devices commonly used in protective motor circuits, and serves primarily to function under conditions which prevent the existing protective devices from accomplishing their normal functions.

The protective system in accordance with the present invention comprises an auxiliary circuit which connects the magnetic contactor circuit with the main circuit breaker such as is normally provided in power circuits to motors, and which is adapted, upon failure of the magnetic contactor to respond to the normal protective devices, to automatically open the main circuit breaker and to prevent closing of the latter until the defect in the magnetic contactor or motor circuits has been corrected.

In accordance with one embodiment of this invention, the control of the circuit breaker, effected by the auxiliary circuit, is responsive to predetermined movements of the contacts of the magnetic contactor, whereby tripping of the circuit breaker will occur only under conditions where the magnetic contactor fails to operate in a normal manner.

In the arrangement constructed in accordance with this invention, the main circuit from a source of energy to a motor is provided with a magnetic contactor (also termed herein "the main switch") and a circuit breaker of more or less conventional design. Manually operable push button switches of standard design for starting and stopping the motor control the circuit connections to the main switch from a point on the line conductors between the main switch and the circuit breaker. The main switch is provided with the usual holding coil and circuit therefor and may also be provided with any of the usual types of overload relays or similar standard protective mechanisms. An auxiliary circuit is provided which includes a solenoid controlling the circuit breaker, a pair of successively operating switches responsive to predetermined movements of the main switch which control the solenoid controlling the circuit breaker, and a relay controlled switch connected to the holding coil circuit of the main switch, which serves to complete the auxiliary circuit.

Figure 2:
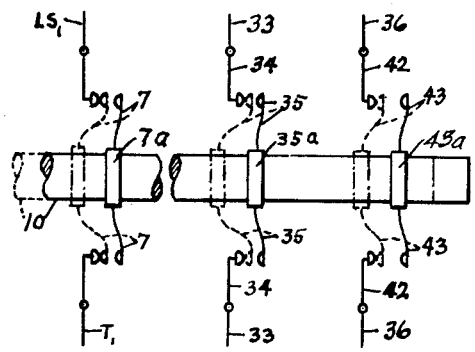

In the drawings:

Fig. 1 is a diagrammatic view of circuits and apparatus illustrating one useful embodiment in accordance with this invention; and Fig. 2 is a diagrammatic representation of one detail of the apparatus illustrated in Fig. 1, showing in solid lines the open position of some of the switch members and their closed positions in dotted lines.

Referring to the drawing, line conductors $L_1$, $L_2$, and $L_3$, which may be connected to any suitable source of three phase current, supply energy to a motor 4. The line conductors to the motor are controlled by a circuit breaker, designated generally by the numeral 5, which is of generally conventional form, except for such modifications, hereinafter described, which are provided to effectuate the objects of this invention. The movable contacts 23, 24, and 25 of the circuit breaker are connected by conductors $LS_1$, $LS_2$, and $LS_3$, respectively, to motor circuits $T_1$, $T_2$, and $T_3$, respectively. The motor circuits are controlled by an electromagnetically operable main switch, designated generally by the numeral 6, commonly termed a "magnetic contactor." Magnetic contactor 6 includes the usual group of movable contacts 7, 8, and 9 mounted on an actuating bar 10, and movable in unison thereby to close the individual circuits to motor 4 of conductors $LS_1$, $LS_2$, and $LS_3$, respectively. Actuating bar 10 is under the control of a holding coil 11, of generally conventional form. A starting circuit, also of generally conventional form which includes holding coil 11, is connected across conductors $LS_1$ and $LS_2$, and includes a lead 12 which connects conductor $LS_1$ at terminal block B, positioned between circuit breaker 5 and magnetic contactor 6, to one end of holding coil 11 and a second lead 13 connecting the other end of holding coil 11 to a terminal block C, located at a point on conductor $LS_2$ also between circuit breaker 5 and magnetic contactor 6. Interposed in lead 12 are a start switch 14 and a stop switch 15, of conventional construction, start switch 14 being normally open and stop switch 15 being normally closed. Interposed in lead 13 are a pair of overload relays 16 and 17 which are connected in series and are under control, respectively, of coils 18 and 19, mounted in circuits $T_1$ and $T_3$, respectively. The overload relays 16 and 17, as illustrated, are of the isothermic type, but may be of the thermal overload type or of any other well-known type. A lead 20 provides a by-pass around start switch 14 and is provided with a switch, including a stationary contact 21 and a moving contact 22, the latter being mounted on actuating bar 10 and adapted to be moved thereby in unison with contacts 7, 8, and 9. Circuit breaker 5, which may be of any generally conventional design, but is illustrated in a generally simplified and schematic form, includes the usual set of contacts 23, 24 and 25 adapted to close line conductors $L_1$, $L_2$, and $L_3$, respectively, and are movably mounted on an actuating bar 26 under control of a toggle spring 27. Bar 26 is provided with a trip mechanism 28, which, when pulled counter to the action of spring 27, trips the circuit breaker and opens the line conductor circuits.

The above described circuits and apparatus constitute an arrangement which is more or less conventional and commonly used in motor circuits. The auxiliary circuits and apparatus provided in accordance with this invention will now be described.

The circuits and devices in accordance with this invention include an electromagnetic control for trip mechanism 28 of the circuit breaker which consists of a solenoid 29 controlling a movable member 30 which is connected to trip mechanism 28 by means of a link 31. A spring 32 is mounted on member 30 and is arranged to counteract the movement of member 30 when coil 29 is energized. One end of coil 29 is connected by a lead 33 to conductor $LS_1$ at a terminal block B. Interposed in lead 33 is a switch including a stationary contact 34 and a movable contact 35, the latter being mounted on actuating bar 10. The other end of coil 29 is connected by a lead 36 to line conductor $LS_2$ at terminal block C. Interposed in lead 36 is a normally open switch 37 which is adapted to be opened and closed by a moving member 38 of a relay including a control coil 39, which is shunt-connected across leads 12 and 13, by means of leads 40 and 41. A second switch consisting of a fixed contact 42 and a movable contact 43, the latter mounted on actuating bar 10, is also interposed in lead 36 between switch 37 and terminal block C.

Movable contacts 35 and 43 are arranged to operate in response to the movements of actuating bar 10 and contact 43 is arranged to operate with a lag relative to contacts 7, 8, 9, 22, and 35, that is, contact 43 is arranged to close at a short interval after contacts 7, 8, 9, 22 and 35 close and to open at a corresponding interval before the latter open.

Fig. 2 illustrates in diagrammatic form an arrangement by which the lag in the operation of switch 42—43 is produced relative to the operation of the other switches controlled by bar 10. For purposes of illustration, only movable contacts 7, 35, and 43 are shown, it being understood that contacts 8, 9, and 22 are arranged in a manner identical to contacts 7 and 35. As illustrated each of the movable contacts are of a double-detent form commonly employed in switch construction. Other suitable or conventional forms may, of course, be employed. Each pair of arms constituting one of the movable contacts is connected to corresponding members 7a, 35a, and 43a, which are rigidly mounted on bar 10 but electrically insulated therefrom. One of the arms of movable contact 7 is arranged opposite the fixed contact on conductor $T_1$. Each of the arms of movable contact 35 is arranged opposite a fixed contact 34, which is connected to one of the branches of lead 33. Similarly each of the arms of movable contact 43 is arranged opposite a fixed contact 42, which is connected to one of the branches of lead 36. However, member 43a which carries the arms of contact 43 is so positioned on bar 10 that when coil 11 is de-energized and the several switches are in the open position, shown in solid lines in Fig. 2, the arms of contact 43 are spaced at a greater distance from the fixed contacts 42 than that between the fixed and movable contacts of the other switches operated by bar 10.

When holding coil 11 is energized, bar 10 is drawn to the left and the movable contacts assume the position shown in dotted lines in Fig. 2. The arrangement of holding coil 11 and bar 10 is such that the extent of movement of bar 10 will be great enough to bring the arms of contact 43 into contact with the opposed fixed contact 42. However, because of the closer spacing between the contacts of the other switches, the latter will make contact before switch 42—43 closes and as bar 10 continues to move to the left to close switch 42—43, the flexible arms of the other switches will merely bend in the direction of movement of bar 10 while still maintaining contact with their opposed fixed contacts. When holding coil 11 is de-energized, bar 10 will move to the right and the arm of movable contact 43 will, of course, separate from fixed contacts 42 before the contacts of the other switches separate.

The operation of the above described apparatus is as follows: Current enters the system through line conductors L₁, L₂, and L₃, and circuit breaker 5 to the stationary contacts of magnetic contactor 6. In practice, circuit breaker 5 is left in the closed position at all times, except when opened manually to permit inspection of the magnetic contactor or the control equipment, or when tripped due to a short circuit in the motor circuit.

To start the motor 4, the start switch 14 is closed completing the circuit from conductor LS₁, through lead 12, start switch 14, stop switch 15, holding coil 11, thence through lead 13, overload relays 16 and 17 to conductor LS₂. This places holding coil 11 directly across conductors LS₁ and LS₂, which are 120 degrees out of phase, and draws actuating bar 10 to the left, thus closing the three movable contacts 7, 8, and 9 of the magnetic contactor, as well as the movable contacts 22, 35 and 43. Current then flows through the holding coil circuit via the auxiliary switch formed by contacts 21 and 22, by-passing start switch 14 and maintaining the circuit after start switch 14 has been released. With the circuit established as described, current is supplied to the motor to place it in operation in the normal manner.

The motor may be stopped by depressing stop switch 15 which opens the circuit through the holding coil 11, deenergizing the same and releasing actuating bar 10, and thereby opening the main contacts of the magnetic contactors and the auxiliary switches which are motivated by gravity and/or mechanical energy in a well-known manner, cutting off the flow of current to the motor.

Of course, if one of the conductors is opened or if excessive current develops in one of the phases, current to the electrical load would be cut off through the normal action of the overload relays 16 and 17 or the de-energization of holding coil 11, such action being in accordance with the normal functioning of control circuits such as have been described.

The auxiliary equipment provided in accordance with this invention functions in the following manner: As previously stated coil 39, is shunted across the circuit of holding coil 11. It follows, therefore, that both these coils will be energized at the same time from the same source and likewise will be de-energized at the same time. De-energization of coil 39 will release member 38 and close switch 37 for purposes to be hereinafter explained.

As previously mentioned, auxiliary switches 34—35, and 42—43 are arranged so that in closing, switch 34—35 closes before switch 42—43 and in opening, switch 42—43 opens before switch 34—35. The purpose of this arrangement is to allow coil 39 to be energized, opening switch 37, before switch 42—43 closes. Thus, when the motor is started in the normal manner and the parts of the system function normally, coil 39 will be energized, opening switch 37 before switch 42—43 is closed, thereby keeping open the auxiliary circuit which includes coil 29 controlling the trip mechanism of the circuit breaker, and the latter, therefore, will remain unaffected. Similarly in a normal stop when holding coil 11 is deenergized, the magnetic contactor switches will open as will the auxiliary switches. In this case de-energizing of coil 11 will be accompanied by de-energizing of coil 39, closing switch 37, but switch 42—43 will have opened prior to the closing of switch 37 and again the auxiliary circuit to coil 29 will be open and the circuit breaker will again remain unaffected.

However, should one or more of the movable contacts 7, 8, and 9 of the magnetic contactor fail to open for any reason, such as by freezing to the corresponding stationary contacts, actuating bar 10 will not be released even though coil 11 is de-energized. Since bar 10 is not released, auxiliary switches 34—35 and 42—43 will remain closed. At the same time when coil 11 is de-energized, coil 39 will be simultaneously de-energized closing switch 37 and current will flow through the auxiliary circuit and energize coil 29, tripping the circuit breaker and cutting off all current from the motor circuits. Should an attempt to re-set the circuit breaker be made, then since switch 37 will remain closed, the circuit breaker will again be immediately tripped. Therefore, the circuit breaker cannot be reset until the defect in the magnetic contactor or motor circuits have been corrected, and the motor will thus be instantly and automatically protected against the hazards normally accompanying defects of the type mentioned.

In practice, the operation of switch 42—43 is so arranged relative to the movement of movable contacts 7, 8, and 9, and 35, that this switch will not open until the movable contacts 7, 8, and 9, have separated from their corresponding stationary contacts by about one-eighth inch. It will be understood that the lag provided between the operation of these sets of switches may be greater or less than one-eighth inch, but may be of any degree desired to meet the requirements of a particular system.

It will be understood that while the illustrative embodiment of this invention as set forth above, is applied to a three-phase circuit, the invention may be similarly applied to other types of circuits.

Various modifications and alterations may be made in the apparatus and circuits herein described within the scope of the appended claims without departing from the spirit of this invention.

What I claim and desire to secure by Letters Patent is:

1. In an electrical circuit including a circuit breaker and a main switch, a holding coil controlling the main switch and a circuit for said holding coil, an auxiliary circuit including electromagnetic means controlling said circuit breaker, a pair of successively operating switches in said auxiliary circuit responsive to pre-determined movements of said main switch to control said auxiliary circuit, and a third switch in said auxiliary circuit controlled by said holding coil circuit to operate in the interval between the operation of said pair of switches.

2. In an electrical circuit including a circuit breaker and a main switch and a holding circuit controlling said main switch, an auxiliary circuit including electromagnetic means controlling said circuit breaker, a normally open switch in said auxiliary circuit controlled by said holding circuit and adapted to close upon de-energization of the holding circuit, and a pair of switches in said auxiliary circuit connected to said main switch and operative thereby to open in succession at an interval corresponding to a predetermined degree of opening of said main switch upon said de-energization of the holding circuit, whereby upon failure of said main switch to open to said pre-determined degree in response to de-energization of said holding circuit, said pair of switches will remain closed and said normally open switch will be closed thereby energizing said electromagnetic means to open said circuit breaker.

3. In an electrical system including an electrical load device having a power supply circuit connected thereto, a circuit breaker and a main switch controlling said power supply circuit and a holding circuit controlling said main switch, a protective system for said device comprising, a normally open auxiliary circuit including solenoid means controlling said circuit breaker, relay means controlled by said holding circuit to close said auxiliary circuit upon de-energization of said holding circuit, and a pair of switches in said auxiliary circuit operative by said main switch, one of said pair of switches being operative at an interval relative to the other determined by the degree of opening of said main switch, whereby upon failure of said main switch to open to said predetermined degree upon de-energization of said holding circuit, said pair of switches will remain closed whereby said solenoid means will be energized to open said circuit breaker.

4. In an electrical circuit including a circuit breaker and an electromagnetically controlled main switch and a control circuit for said main switch, an auxiliary circuit including a solenoid controlling said circuit breaker, a pair of switches in said auxiliary circuit in series with said solenoid, said pair of switches being mechanically connected to said main switch and arranged to operate in succession in response to pre-determined movements thereof, a relay-controlled switch in said auxiliary circuit, and a relay actuable by said control circuit to operate said relay-controlled switch during the interval between the operation of said pair of switches.

MILTON K. MOORE.

REFERENCES CITED

The following references are of record in the file of this patent:

UNITED STATES PATENTS

| Number | Name | Date |
|---|---|---|
| 1,336,158 | Ream | Apr. 6, 1920 |
| 1,953,127 | Parsons | Apr. 3, 1934 |
| 1,999,301 | Mellon | Apr. 30, 1935 |
| 2,053,150 | Keep | Sept. 1, 1936 |
| 2,114,055 | Leece | Apr. 12, 1938 |
| 2,173,157 | Dressler | Sept. 19, 1939 |
| 2,202,535 | Pedatella | May 28, 1940 |
| 2,307,315 | Wolfe | Jan. 5, 1943 |